United States Patent
Schertzberg et al.

(10) Patent No.: US 6,544,612 B2
(45) Date of Patent: *Apr. 8, 2003

(54) INJECTION HOSE AND METHOD OF CONSTRUCTION THEREOF

(76) Inventors: Paul R. Schertzberg, 236 Lincoln Road, Waterloo, Ontario (CA), N2J 2P3; Gary J. Watson, 32 McGibbon Court, Kitchener, Ontario (CA), N2A 3P2

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,988

(22) Filed: Jul. 17, 1998

(65) Prior Publication Data

US 2002/0009566 A1 Jan. 24, 2002

Related U.S. Application Data

(60) Provisional application No. 60/053,188, filed on Jul. 21, 1997, now abandoned.

(51) Int. Cl.[7] .............................. C09K 3/10; F16L 11/08
(52) U.S. Cl. ................ 428/36.9; 428/308.4; 428/314.4; 428/319.3
(58) Field of Search ................ 428/34.5, 36.1, 428/36.4, 36.9, 308.4, 314.4, 319.3

(56) References Cited

U.S. PATENT DOCUMENTS

| 5,290,045 A | * | 3/1994 | Terauchi et al. ............. 277/1 |
| 5,328,647 A | * | 7/1994 | Koob ......................... 264/34 |

FOREIGN PATENT DOCUMENTS

| DE | 3508593 | * | 9/1986 |
| DE | 3524404 | * | 1/1987 |
| DE | 3642919 | * | 6/1988 |
| DE | 4314302 A1 | * | 8/1994 |
| DE | 29612245 U1 | * | 9/1996 |
| SU | 494763 | * | 3/1976 |

* cited by examiner

Primary Examiner—Sandra M. Nolan
(74) Attorney, Agent, or Firm—Daryl W. Schnurr

(57) ABSTRACT

An injection hose for use in filling voids in concrete during installation of expansion joints is made from fibre-reinforced plastic and has four longitudinal rows of staggered slits in a side wall thereof. The hose is connected between two elbows having nipples to receive an epoxy source. Epoxy is injected into the tubular members and then into the hose at each end simultaneously. The pressure from the epoxy opens the slits and exits into the void in which the hose is located.

18 Claims, 3 Drawing Sheets

INJECTION HOSE AND METHOD OF CONSTRUCTION THEREOF

This application claims U.S. Provisional Application No. 60/053,188 filed Jul. 21, 1997 and now abandoned as priority.

BACKGROUND OF THE INVENTION

1. Field of the Invention

This invention relates to an injection hose for use in filling voids in concrete and to a method of construction thereof. More particularly, this invention relates to an injection hose that is used to inject epoxy and the like to fill voids created during concrete construction.

2. Description of the Prior Art

During installation of an expansion joint, it is known to fill voids left in the concrete with epoxy. During installation of the expansion joint, a hose is laid into that area where a void is likely to form before the concrete is poured. The hose has two ends, both fixed. Each fixed end is connected to an elbow which has a hydraulic nipple into which a source of epoxy can be injected. Then, after the concrete is poured and has been allowed to cure, epoxy can be injected into the hose through the elbow by connecting the source of epoxy to the nipple. Previous hoses have an interior support (usually made out of metal or plastic) to prevent the hose from collapsing and a wall formed out of a cloth or membrane to allow epoxy to escape through the sides of the hose through the cloth or membrane but preventing concrete from entering the hose. Previous hoses are extremely expensive. Since the hose remains embedded in the concrete and epoxy within the void after the epoxy has been used to fill the void, the hose cannot be reused and the cost of the hose is a very important factor. Also, as the length of the hose varies with the length of the void, the hose must often be severed. Because of the metal support, previous hoses can be difficult to cut. Further, the slope of the void sometimes requires the hose to bend and curve sharply. The metal support can make it difficult or impossible to bend or curve the hose sharply.

SUMMARY OF THE INVENTION

It is an object of the present invention to provide an inexpensive hose that is strong enough to withstand pressure from the concrete, flexible enough to be placed around corners, rigid enough to allow the epoxy to flow through the hose before exiting through a side wall of the hose and soft enough to have strategically placed slits along its length.

A hose is used in combination with a tubular member and nipple to receive epoxy. The hose has a tubular shape with a reinforced plastic wall. The wall has a plurality of short slits located therein, the slits being short enough to remain closed when the hose has an internal pressure equal to or less than an external pressure and long enough to open when the hose has a higher internal pressure from epoxy than an external pressure to allow epoxy to escape. The slits are sized and oriented so that a compression strength of the hose is not weakened significantly. The hose is connected to one end of the tubular member and the nipple is connected to another end of the tubular member.

Preferably, the hose is used in combination with a tubular member and nipple to receive epoxy.

A method of constructing a hose to fill a void located in concrete, the hose having a wall made from reinforced plastic, said method comprising cutting four longitudinal rows of slits in said wall of said hose, said rows being approximately 80° to 100° apart from one another, staggering said slits in adjacent rows so that the slits in rows that are substantially opposite to one another are mirror images of one another and slits in adjacent rows are staggered from one another, not removing any material once said slits are cut and cutting said hose to a desired length, connecting one end of said hose to one end of a tubular member, said tubular member having another end that is adapted to receive a nipple.

DESCRIPTION OF A PREFERRED EMBODIMENT

Figure 1:
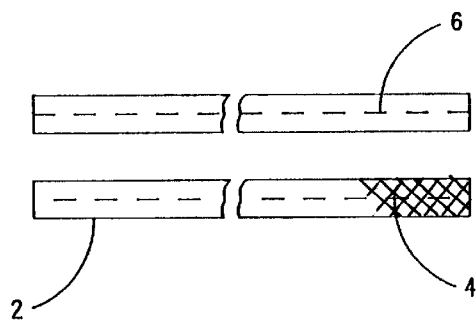
FIG. 1 is a side view of two lengths of fibre-reinforced hose that are oriented 90° relative to one another.

In FIG. 1, there are two lengths of injection hose 2 that are oriented 90° relative to one another. Each hose 2 contains fibre-reinforcement 4 and a plurality of slits 6. It can be seen that the slits 6 of the uppermost length of hose 2 are offset from the slits 6 in the lowermost length of hose 2. The fibre-reinforcement 4 extends along the entire length of the hose but is only partially shown so as not to obscure the slits.

Figure 2:
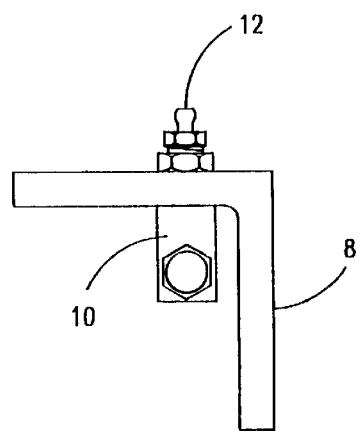
FIG. 2 is an end view of a nipple and brass elbow extending through an angle iron.
Figure 3:
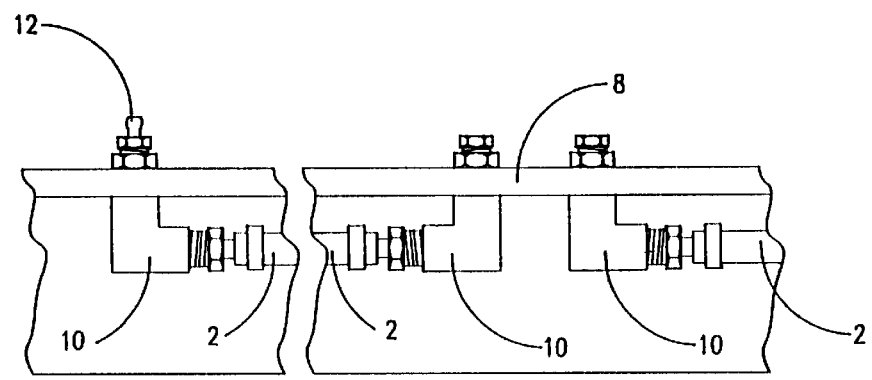
FIG. 3 is a side view of brass elbows extending through said angle iron.

FIGS. 2 and 3 show an angle iron 8 having a brass elbow 10 therein. The brass elbow has a nipple 12 at one end thereof. The nipple 12 extends through the angle iron 8. An opposite end of the brass elbow 10 has an injection hose 2 connected thereto. The hose 2 is connected to brass elbows 10 at each end. In an expansion joint, the injection hoses usually have a maximum length of 2 metres. If the void is greater than 2 metres, then extra injection hoses are used, each connected to a brass elbow. The nipple 12 is removable and can be moved from one elbow to another or each tubular member can have a nipple. The purpose of the nipple is to receive an epoxy source in order to inject epoxy into the nipple, through the elbow and into the hose. The epoxy can be hydraulically injected into the hose through the nipple. The epoxy can be injected into all of the brass elbows shown in FIG. 3 simultaneously using a nipple in each tubular member or one at a time.

Figure 4:
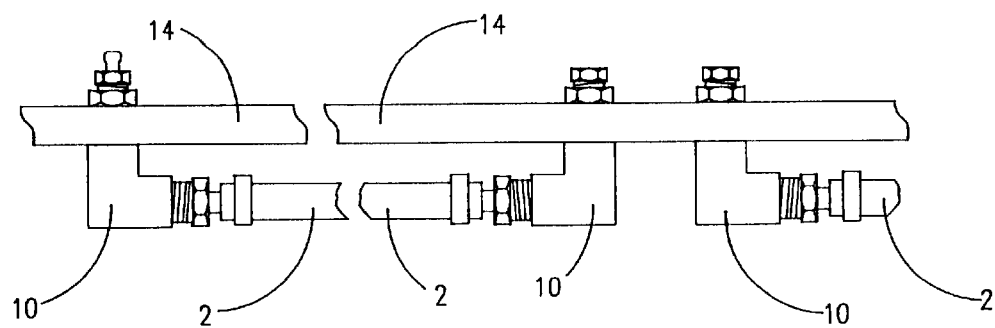
FIG. 4 is a side view of elbows extending through a flat plate.

In FIG. 4, three brass elbows 10 are mounted into a flat plate 14. The same reference numerals are used in FIG. 4 as that used in FIGS. 2 and 3 to describe those components that are identical without further description. A fourth brass elbow (not shown) would be located at the end of the hose that is shown with only one elbow. Preferably, one injection hose 2 extends between two tubular members and epoxy is injected into one end of the hose through one tubular member while the other tubular member is blocked off. Or, epoxy can be injected into both tubular members simultaneously at each end of the hose using two nipples. Where epoxy is injected into a single hose where a free end of the hose lies in the void, the free end is blocked off. Otherwise, the epoxy will flow out the free end without being forced through the slits.

Figure 5:
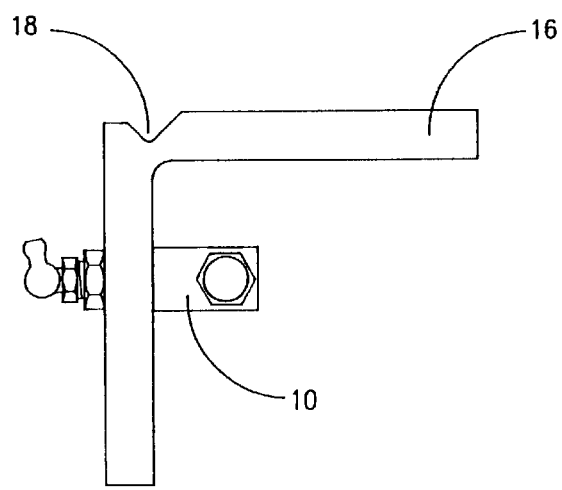
FIG. 5 is an end view of an elbow extending through an angle iron.
Figure 6:
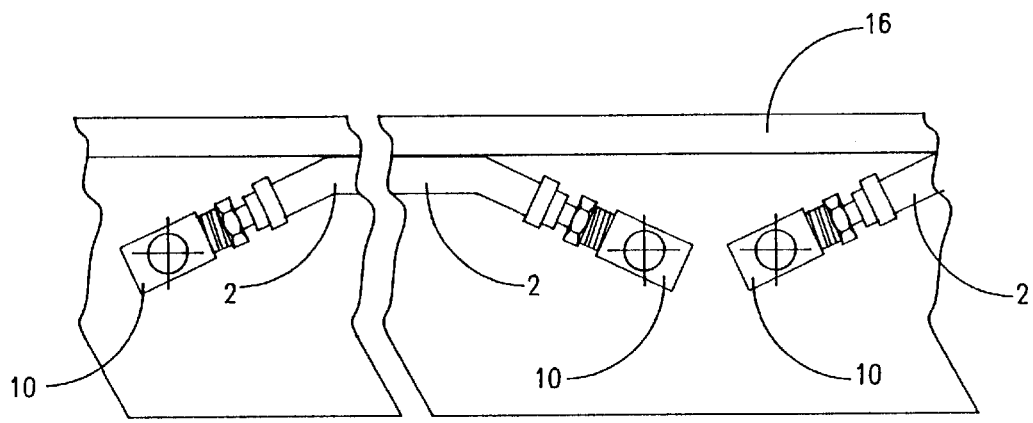
FIG. 6 is a side view of elbows connected to injection hoses where said elbows are mounted on an angle.

In FIGS. 5 and 6, angle iron 16 contains a notch 18 and the brass elbows 10 are located in a vertical part of the angle iron 16. As can best be seen from FIG. 6, the elbows are mounted at an angle relative to the angle iron and the injection hose 2 connected to each elbow is also mounted on an angle.

Figure 7:
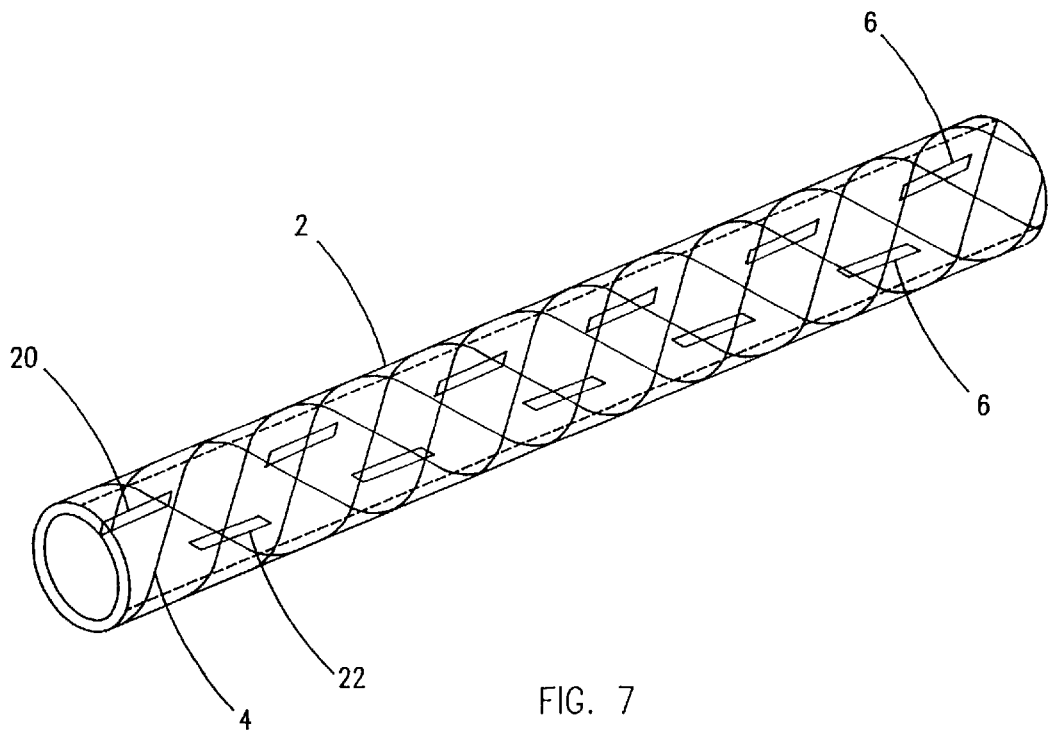
FIG. 7 is an enlarged perspective view of a partial length of fibre-reinforced hose having staggered slits.

In FIG. 7, an enlarged perspective view of part of the hose 2 provides a better view of the slits 6. In each section of hose, there are preferably four rows 20, 22 (only two of which are shown). It can be seen that the slits 6 in row 20 are staggered from the slits 6 in row 22. The other two rows that are not shown in FIG. 7 will also have staggered slits so that the rows that are 90° apart from one another will have staggered slits and rows that are 180° apart from one another will have slits that are identically aligned with one another. The rows that are 180° apart are mirror images of one another.

Figure 8:
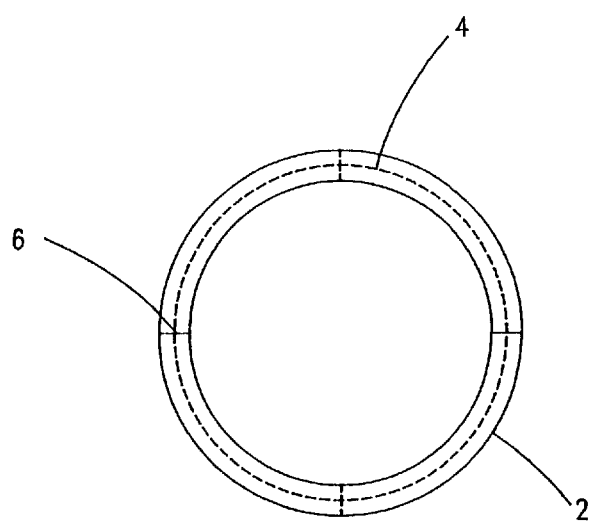
FIG. 8 is a schematic enlarged end view of the hose in FIG. 7.

In FIG. 8, there is shown a schematic enlarged end view of the hose 2 shown in FIG. 7. In the three o'clock and nine o'clock positions shown, there are two rows of slits 6 that are 180° apart from one another. In the twelve o'clock and six o'clock positions shown, there is a dotted line representing rows of slits that are 180° apart from one another. These two slits are shown in dotted lines to emphasize that the slits in the immediately adjacent rows are staggered from one another and the slits in rows that are opposite to one another are mirror images of one another. The rows are preferably approximately 90° apart from one another but, with four rows of slits in a length of hose, the adjacent rows could be substantially 80° to 100° apart from one another.

The purpose of the injection hoses is to distribute epoxy through the entire hose and out the slits 6. It is important that the epoxy enter the hose a reasonable distance before it exits through the slits 6 at least to any appreciable degree. Preferably, epoxy will pass through all of the slits. Preferably, epoxy will fill the hose first and then will uniformly exit through the slits to fill voids between the concrete and the steel angle iron. In this way, the entire void will be filled with epoxy. If epoxy were to exit the slits near the elbow first, it is possible that that epoxy might cure before the void is completely filled and the hose may become blocked. It is also important that the hose not become blocked with concrete or stones and not collapse under the weight of the concrete or stones. The purpose of filling the voids is to prevent condensation and therefore premature failure in the expansion joints with which the injection hose is used.

The injection hose is much less expensive than previous hoses and can be quickly and easily cut to the desired length and is strong enough to resist pressure from the concrete, yet flexible enough to curve or bend sharply, without collapsing. Also, the slits are short enough to remain closed when the hose has an internal pressure equal to or less than an external pressure and long enough to open when said hose has a higher internal pressure from epoxy than an external pressure to allow epoxy to escape through the slits. The slits are sized and oriented so that a compression strength of the hose is not weakened significantly. Preferably, the slits are separated longitudinally by a distance approximately equal to their length and, still more preferably, the slits are approximately 6 mm long. The hose is preferably reinforced with fibre so that the hose can be easily cut to desired lengths and the slits can be easily formed within the hose. Four longitudinal rows of slits are cut into the wall of the hose, the rows being approximately 80° to approximately 100° apart from one another. Preferably, the adjacent rows are substantially 90° apart from one another. The slits in adjacent rows are staggered to maintain sufficient compression strength in the hose and also to more evenly distribute the epoxy. No material is removed from the hose when the slits are cut and this allows the slits to remain fully closed when the internal pressure of the hose is equal to or less than the external pressure. Preferably, the hose has a compression strength to withstand pressure from up to 3 feet of concrete without collapsing. When the concrete forms are being constructed, the injection hoses and tubular members are placed into those areas where voids are expected to occur. If concrete should fill part of the void, it is important that the hose have sufficient compression strength so that it does not collapse from the weight of the concrete. It is particularly important that a length of hose closer to the tubular member does not collapse while a void remains at a free end of the hose. If this were to occur, of course, epoxy could no longer be passed through the hose and the void could not be filled. Injection hoses of the type described are particularly designed for use during the installation of an expansion joint.

The hose of the present invention can easily be cut at the site by any cutting tool, for example, a knife. The hose is rigid enough to withstand the pressure of concrete, yet flexible enough to fit into spaces where the hose must be curved. The tubular members are preferably elbows made from metal and still more preferably made from brass.

We claim:

1. A hose for use with a tubular member and nipple to receive epoxy, said hose comprising a tubular shape with a reinforced plastic wall defining a hollow core within said wall, said wall having a plurality of short slits located therein, said slits extending through said wall to said hollow core, said slits being sized and oriented so that a compression strength of the hose is not weakened significantly, said slits remaining closed when said hose has an internal pressure equal to or less than an external pressure and opening when said hose has a higher internal pressure from epoxy than an external pressure to open said slits and allow epoxy to escape, said hose being connected to one end of said tubular member and said nipple being connected to another end of said tubular member, said hose having a compression strength to withstand pressure from up to three feet of concrete without collapsing, said hose being flexible to allow the hose to be curved.

2. A hose as claimed in claim 1 wherein the slits are arranged in rows.

3. A hose as claimed in claim 2 wherein the slits are separated longitudinally by a distance approximately equal to their length.

4. A hose as claimed in claim 3 wherein the slits are approximately 6 mm long.

5. A hose as claimed in claim 3 wherein the slits are arranged in four rows extending longitudinally along said hose, each row being approximately 80° to 100° apart from one another.

6. A hose as claimed in claim 5 wherein the slits in rows adjacent to one another are staggered relative to one another and the slits in rows that are opposed to one another are mirror images of one another.

7. A hose as claimed in claim 6 wherein the rows are substantially 90° apart from one another.

8. A hose as claimed in claim 1 wherein said plastic wall is reinforced with fibre.

9. A hose as claimed in claim 1 wherein a free end of the hose away from said tubular member is blocked.

10. A hose as claimed in claim 1 wherein said hose is connected to a tubular member at each end.

11. A hose as claimed in claim 10 wherein each tubular member has a nipple connected thereto.

12. A hose as claimed in claim 10 wherein a passage in one tubular member is blocked.

13. A method of constructing a hose to fill a void located in concrete, said hose having a wall made from reinforced plastic defining a hollow core within said wall, said method comprising Gutting four longitudinal rows of slits in said wall of said hose, said slits extending through said wall to said hollow core, said rows being approximately 80° to approximately 100° apart from one another, staggering said slits in adjacent rows so that the slits in rows that are substantially opposite to one another are mirror images of one another and slits in adjacent rows are staggered from one another, not removing any material when said slits arc cut so that said slits remained closed when the hose is at rest and will open when the hose is subjected to sufficient internal pressure, cutting said hose to a desired length, connecting one end of said hose to one end of a tubular member, said tubular member having another end that is adapted to receive a nipple.

14. A method as claimed in claim 13 including the step of choosing a hose that has a compression strength to withstand pressure up to 3 feet of concrete without collapsing.

15. A hose in combination with a tubular member and nipple to receive epoxy, said combination comprising a tubular shape with a reinforced plastic wall defining a hollow center core, said wall having a plurality of short slits located therein, said slits extending through said wall to said hollow center core, said slits being sized and oriented so that a compression strength of the hose is not weakened significantly, said slits remaining closed when said hose has an internal pressure equal to or less than an external pressure and opening when said hose has a higher internal pressure from epoxy than an external pressure to open said slits and allow epoxy to escape, said hose being connected to one end of said tubular member and said nipple being connected to another end of said tubular member.

16. A hose in combination with a tubular member and nipple as claimed in claim 15 wherein said slits are arranged in four rows extending longitudinally along said hose, each row being approximately 80° to 100° apart from one another.

17. A hose in combination with a tubular member and nipple as claimed in claim 16 wherein the slits and rows that are adjacent to one another are staggered relative to one another and slits and rows that are opposed to one another are mirror images of one another.

18. A hose in combination with a tubular member and nipple as claimed in claim 15 wherein said hose has a compression strength to withstand pressure from up to three feet of concrete without collapsing, said hose being flexible to allow the hose to be curved.

* * * * *